(12) United States Patent  (10) Patent No.: US 8,863,019 B2
Pourshahid et al.  (45) Date of Patent: Oct. 14, 2014

(54) MODIFYING NUMERIC DATA PRESENTATION ON A DISPLAY

(75) Inventors: Alireza Pourshahid, Ottawa (CA); Graham A. Watts, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 650 days.

(21) Appl. No.: 13/074,673

(22) Filed: Mar. 29, 2011

(65) Prior Publication Data

US 2012/0254783 A1  Oct. 4, 2012

(51) Int. Cl.
*G06F 3/048* (2013.01)
*G06F 3/0488* (2013.01)
*G06F 17/24* (2006.01)

(52) U.S. Cl.
CPC .......... *G06F 3/04883* (2013.01); *G06F 17/246* (2013.01); *G06F 2203/04808* (2013.01)
USPC ....................................................... 715/771

(58) Field of Classification Search
CPC .... G06F 3/048; G06F 3/04883; G06F 17/246
USPC ............................ 715/771; 345/173, 156, 619
See application file for complete search history.

(56) References Cited

U.S. PATENT DOCUMENTS

| | | | | |
|---|---|---|---|---|
| 5,550,964 | A * | 8/1996 | Davoust | 345/440 |
| 5,581,678 | A * | 12/1996 | Kahn | 345/440 |
| 5,619,631 | A * | 4/1997 | Schott | 345/440 |
| 5,990,888 | A * | 11/1999 | Blades et al. | 715/764 |
| 6,677,929 | B2 * | 1/2004 | Gordon et al. | 345/156 |
| 7,557,797 | B2 * | 7/2009 | Ludwig | 345/163 |
| 2002/0087275 | A1 * | 7/2002 | Kim et al. | 702/19 |
| 2002/0120551 | A1 * | 8/2002 | Jones, III | 705/37 |
| 2002/0126318 | A1 * | 9/2002 | Katayama | 358/402 |
| 2005/0068320 | A1 * | 3/2005 | Jaeger | 345/440 |
| 2005/0275622 | A1 * | 12/2005 | Patel et al. | 345/156 |
| 2006/0147884 | A1 * | 7/2006 | Durrell | 434/236 |
| 2007/0247435 | A1 * | 10/2007 | Benko et al. | 345/173 |

(Continued)

FOREIGN PATENT DOCUMENTS

WO  2008/086060 A2  7/2008

OTHER PUBLICATIONS

Yellow Fin International Pty Ltd., "Making Mobile Business Intelligence Easy," www.yellowfinbi.com/Document.i4?DocumentId=113749, 2010 (3 pages).

(Continued)

*Primary Examiner* — Phenuel Salomon
(74) *Attorney, Agent, or Firm* — James L. Baudino

(57) ABSTRACT

Various systems, processes, and products may be used to modify numeric data presented on a display. In particular implementations, a system, a process, and a product for modifying numeric data presented on a display may include the ability to generate a user interface including a section that has numeric data in a report format and to determine when input via one or more user digits contacting a display presenting the user interface has been received. The system, the process, and the product may also include the ability to determine whether the digit input is a command regarding the numeric data and to generate, based on the command determination, a user interface that modifies the presentation of the numeric data and represents at least the majority of the numeric data.

18 Claims, 21 Drawing Sheets

(56) References Cited

U.S. PATENT DOCUMENTS

2010/0097322 A1* 4/2010 Hu et al. .................. 345/173
2011/0066933 A1* 3/2011 Ludwig .................... 715/212
2011/0115814 A1* 5/2011 Heimendinger et al. ..... 345/619

OTHER PUBLICATIONS

Oracle, "Oracle Business Indicators: Configuration and User Guide," http://www.oracle.com/technetwork/middleware/bi/business-indicators-config-166769.pdf?ssSourceSiteId=ocomen, Aug. 2009 (22 pages).

Field Technologies Online, "MicroStrategy Announces General Availability of MicroStrategy Mobile for the IPhone and iPad," www.fieldtechnologiesonline.com/article.mvc/MicroStrategy-Announces-General-Availability-0001?VNETCOOKIE=NO, Jul. 12, 2010 (2 pages).

Qlikview, "QlikView for Mobile," www.qlikview.com/us/explore/products/qv-for-mobile/for-iphone, printed on Mar. 23, 2011 (4 pages).

Roambi, "The Roambi App," www.roambi.com/iphone-features.html?video=video_2, printed on Mar. 23, 2011 (1 page).

* cited by examiner

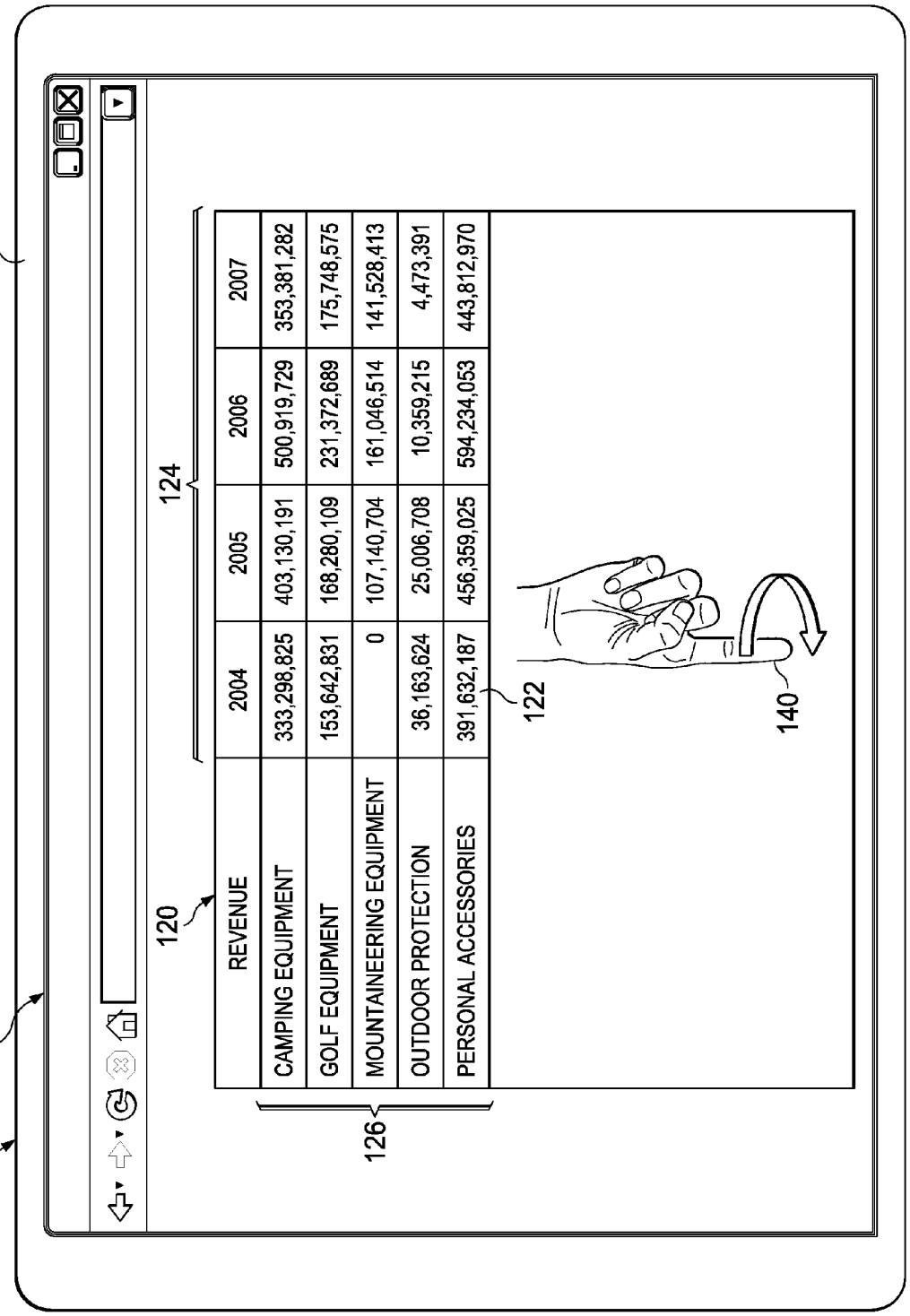

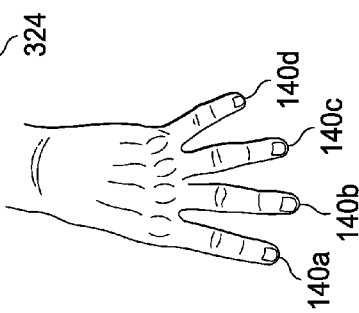
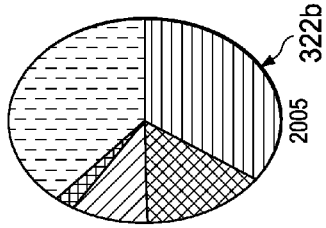
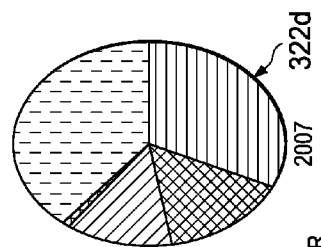
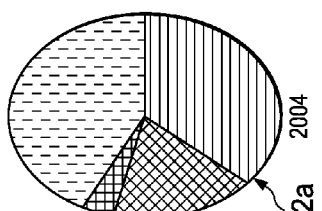
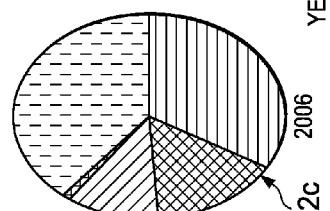
FIG. 3A

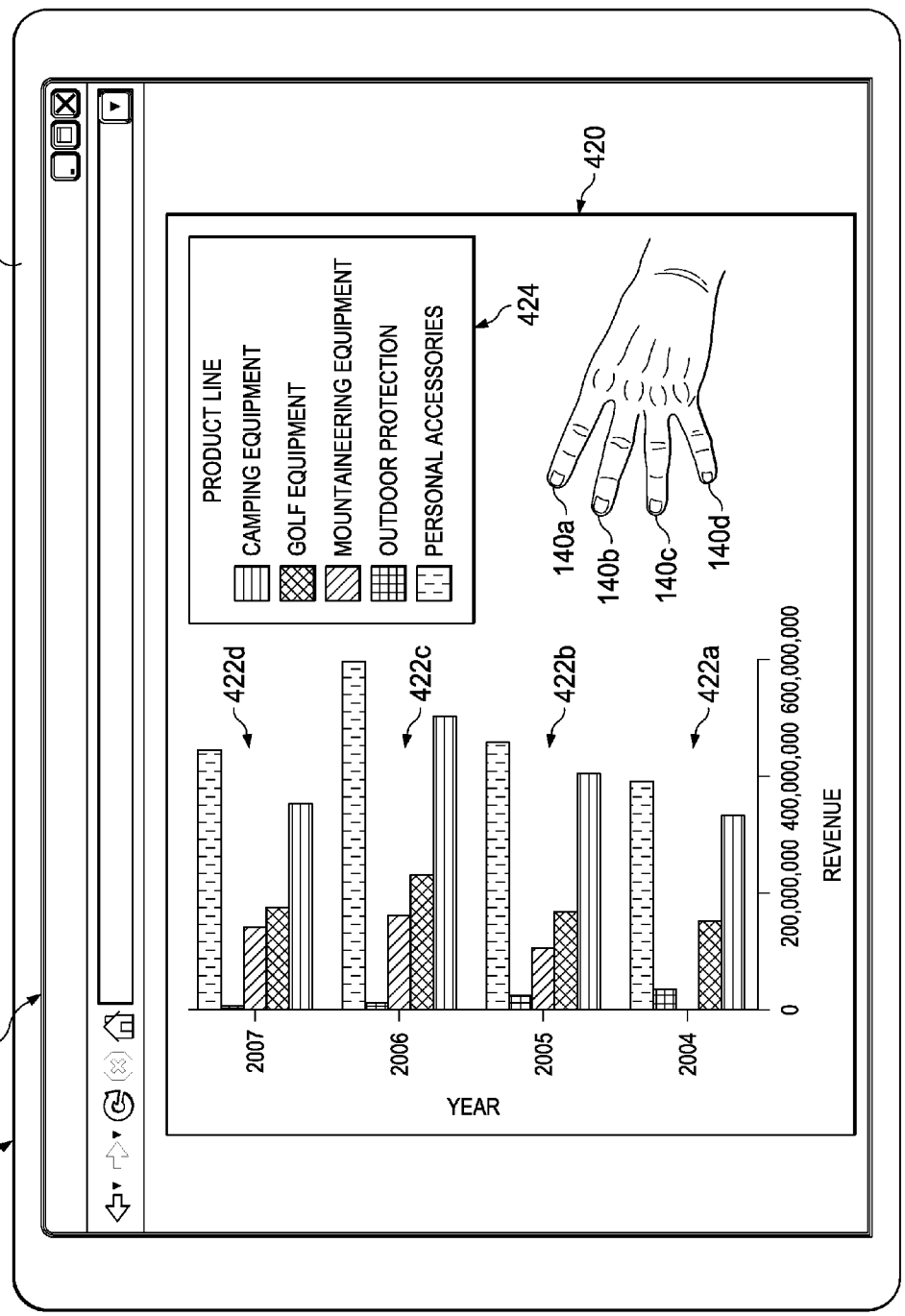

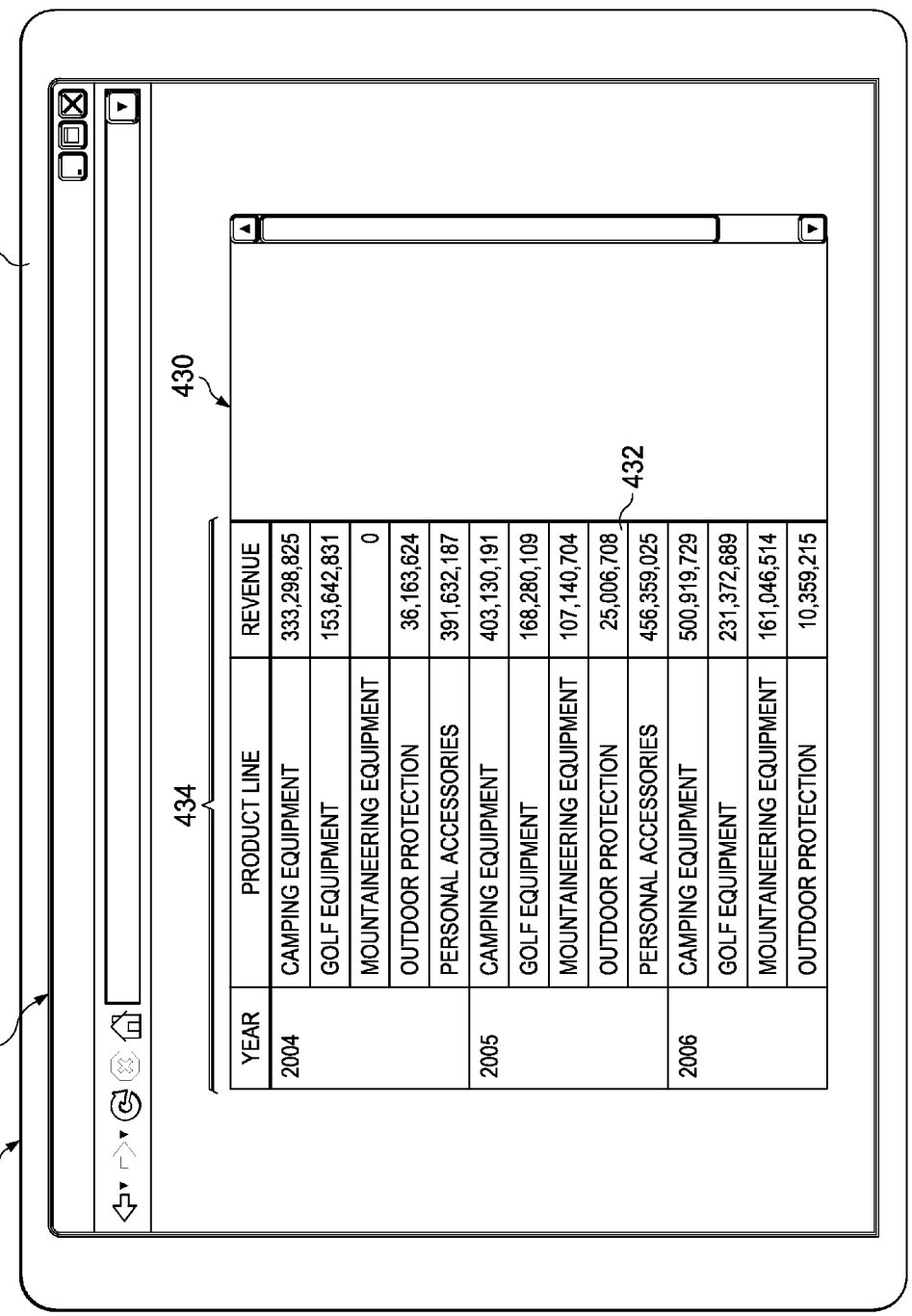

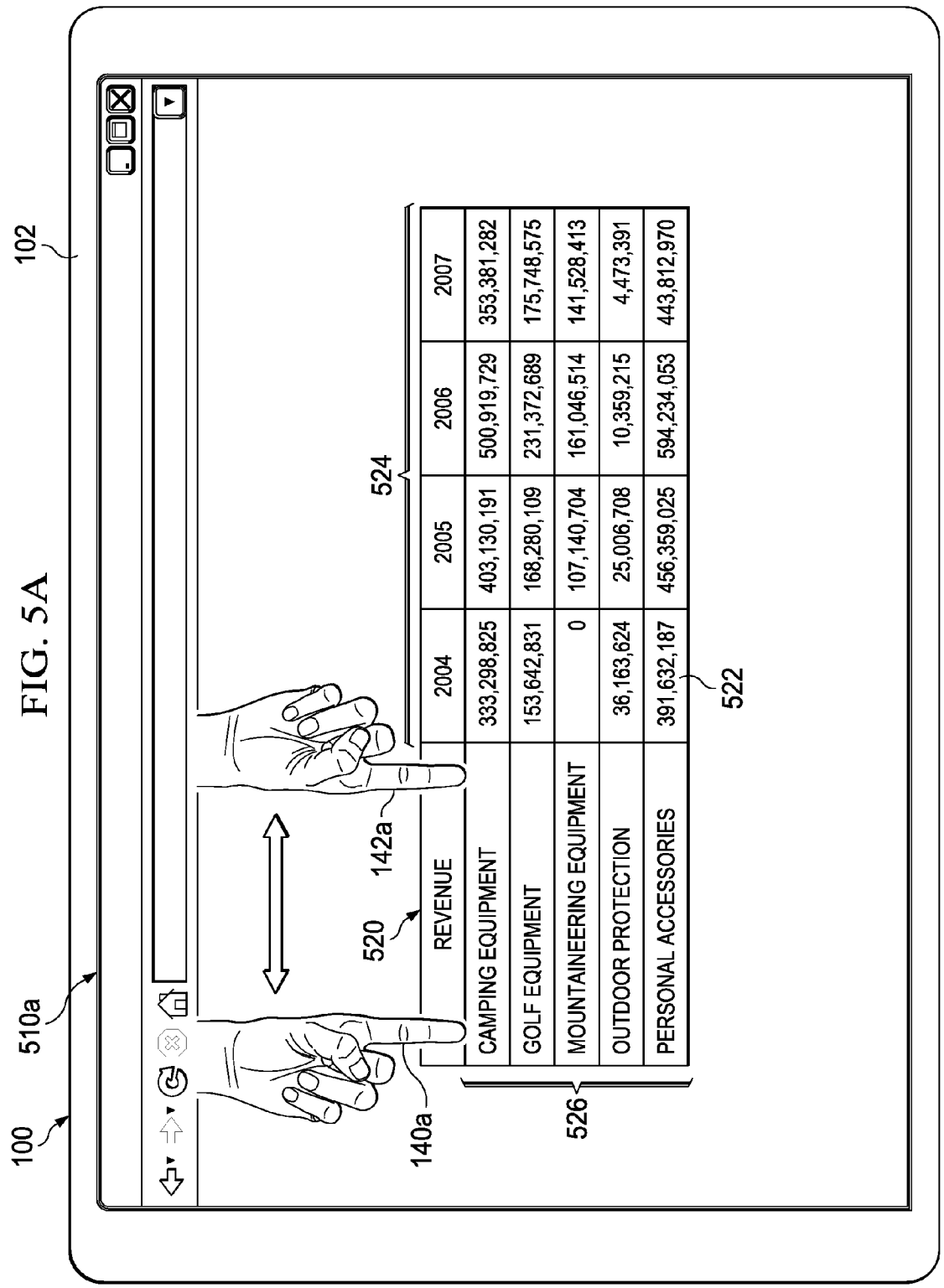

FIG. 5B

| REVENUE | 2004 | 2005 | 2006 | 2007 |
|---|---|---|---|---|
| COOKING GEAR | 59,830,149 | 70,917,101 | 83,918,812 | 58,317,366 |
| LANTERNS | 28,668,746 | 29,788,563 | 40,438,446 | 28,043,199 |
| PACKS | 70,295,378 | 87,542,548 | 111,130,289 | 83,219,058 |
| SLEEPING BAGS | 65,238,410 | 77,066,502 | 98,320,445 | 68,868,594 |
| TENTS | 109,266,142 | 137,815,477 | 167,111,737 | 114,933,065 |
| CAMPING EQUIPMENT | 333,298,825 | 403,130,191 | 500,919,729 | 353,381,282 |
| GOLF EQUIPMENT | 153,642,831 | 168,280,109 | 231,372,689 | 175,748,575 |
| MOUNTAINEERING EQUIPMENT | 0 | 107,140,704 | 161,046,514 | 141,528,413 |
| OUTDOOR PROTECTION | 36,163,624 | 25,006,708 | 10,359,215 | 4,473,391 |
| PERSONAL ACCESSORIES | 391,632,187 | 456,359,025 | 594,234,053 | 443,812,970 |

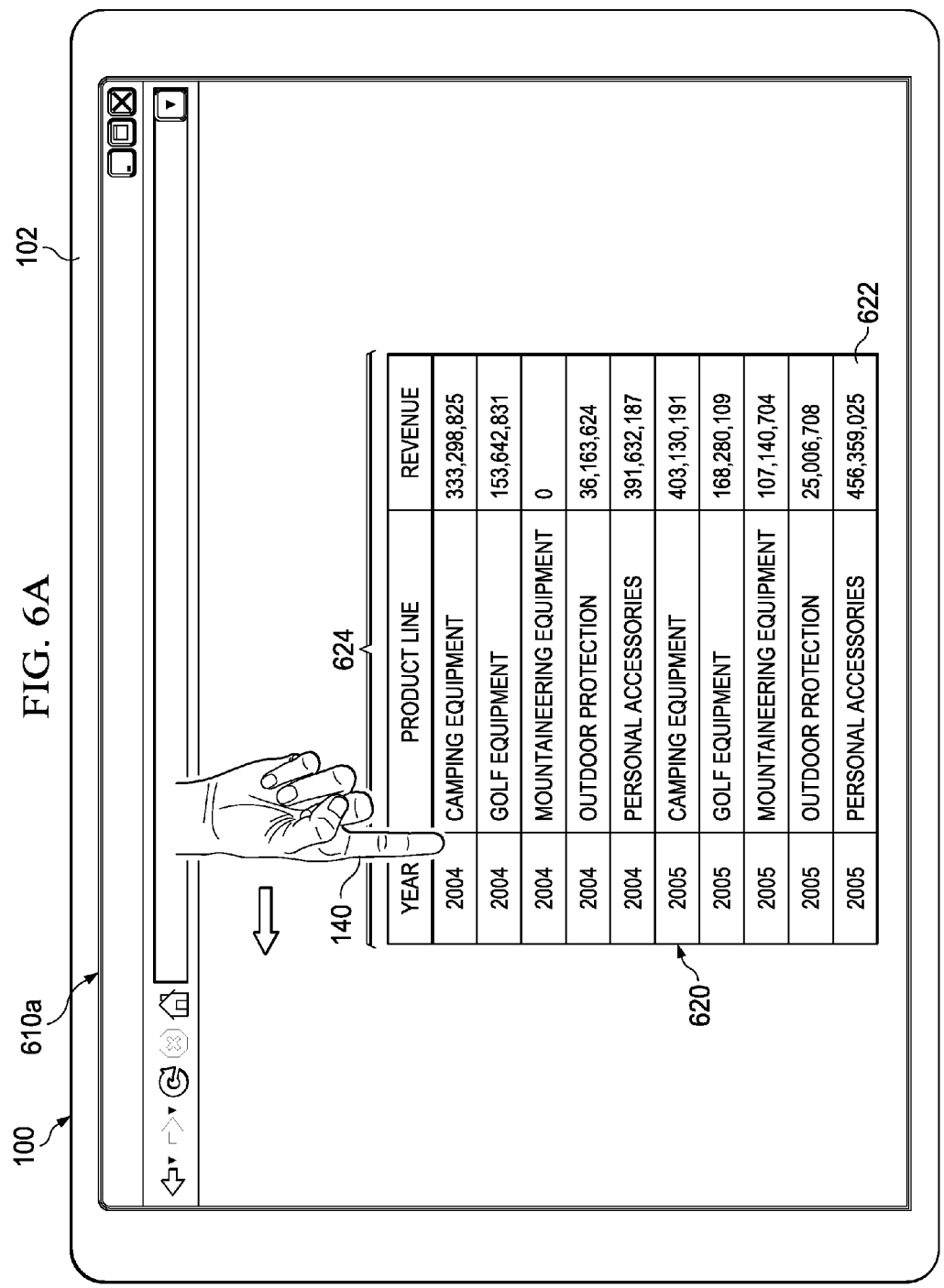

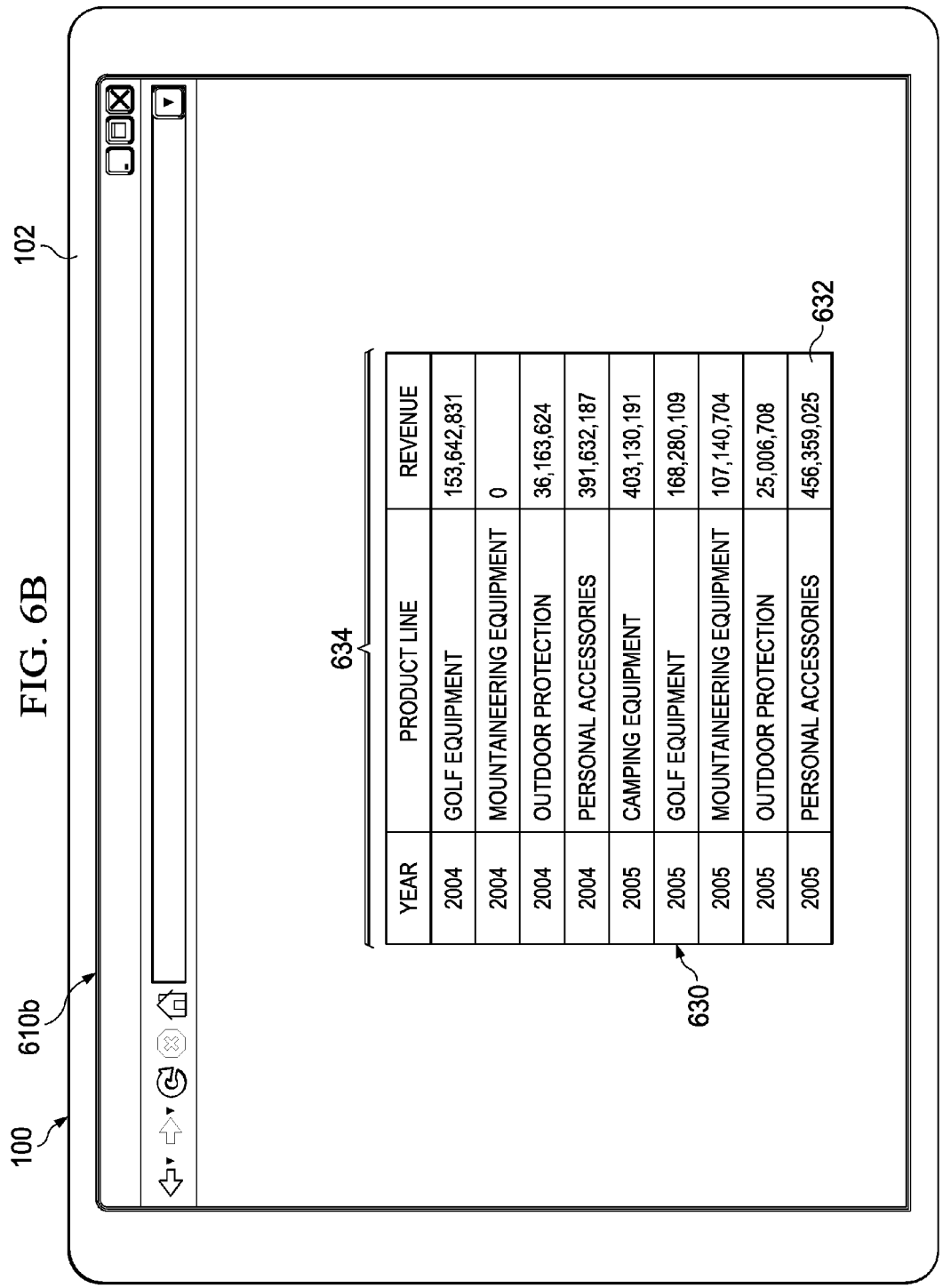

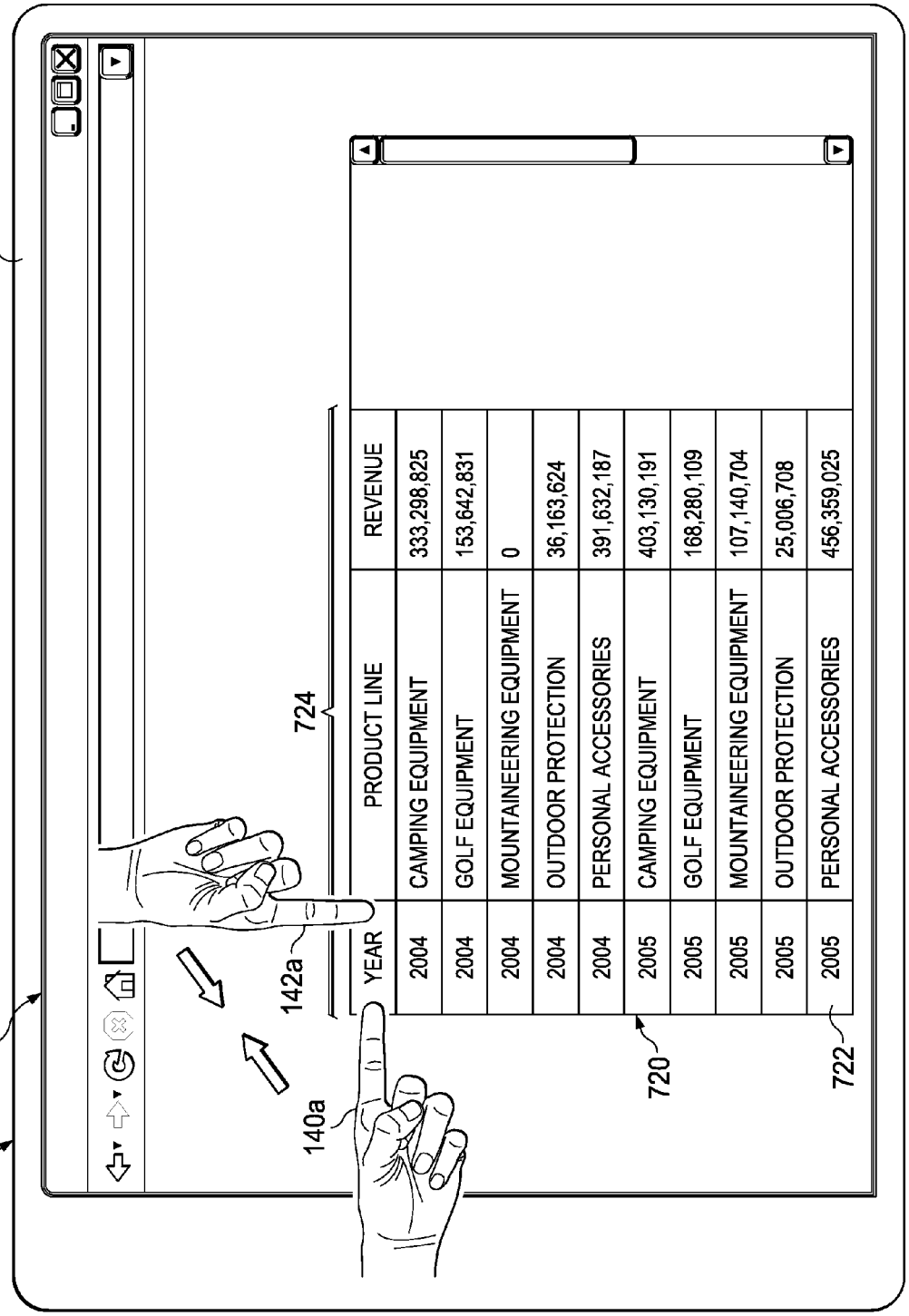

| YEAR | PRODUCT LINE | REVENUE |
|---|---|---|
| 2004 | CAMPING EQUIPMENT | 333,298,825 |
| | GOLF EQUIPMENT | 153,642,831 |
| | MOUNTAINEERING EQUIPMENT | 0 |
| | OUTDOOR PROTECTION | 36,163,624 |
| | PERSONAL ACCESSORIES | 391,632,187 |
| 2005 | CAMPING EQUIPMENT | 403,130,191 |
| | GOLF EQUIPMENT | 168,280,109 |
| | MOUNTAINEERING EQUIPMENT | 107,140,704 |
| | OUTDOOR PROTECTION | 25,006,708 |
| | PERSONAL ACCESSORIES | 456,359,025 |

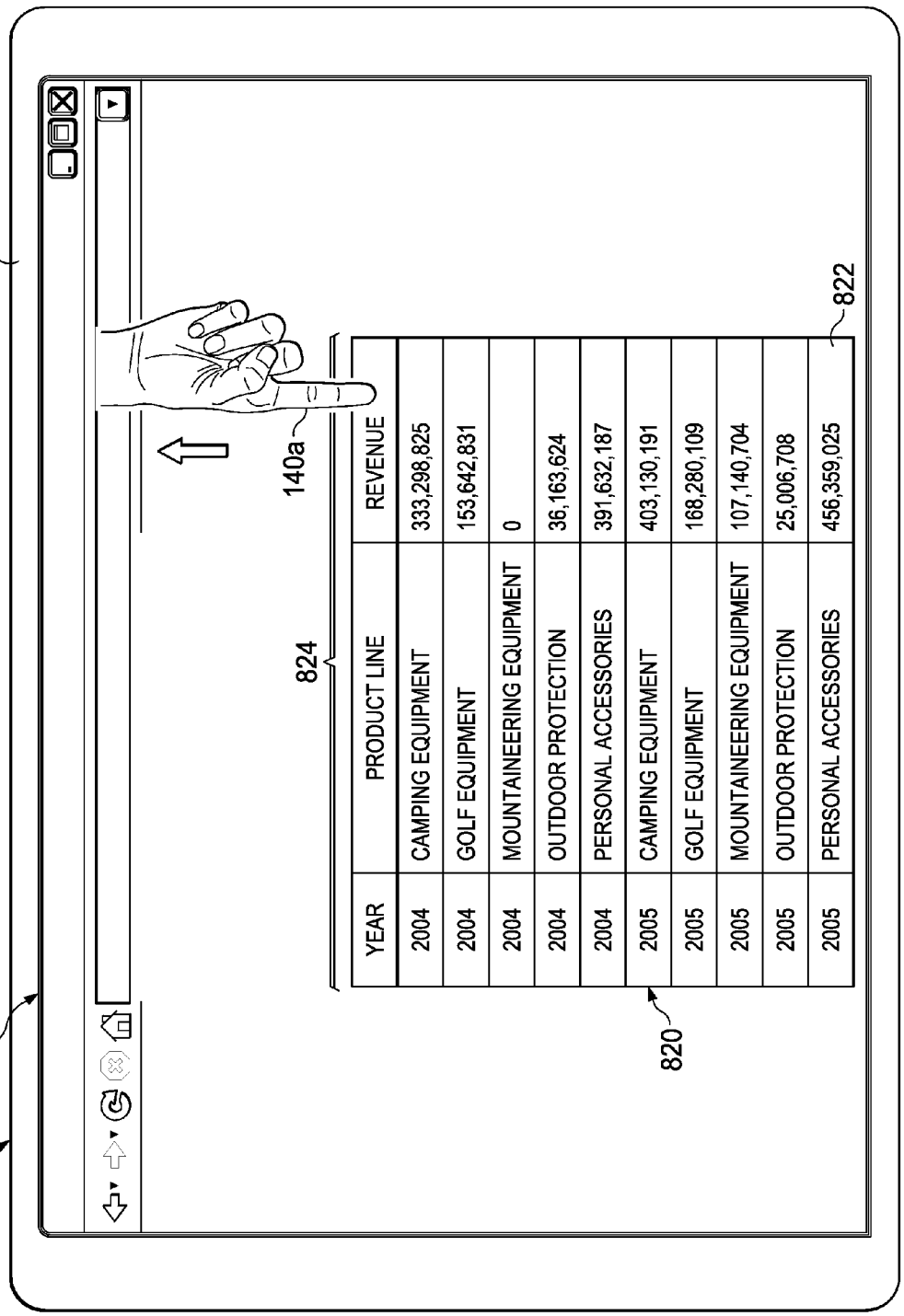

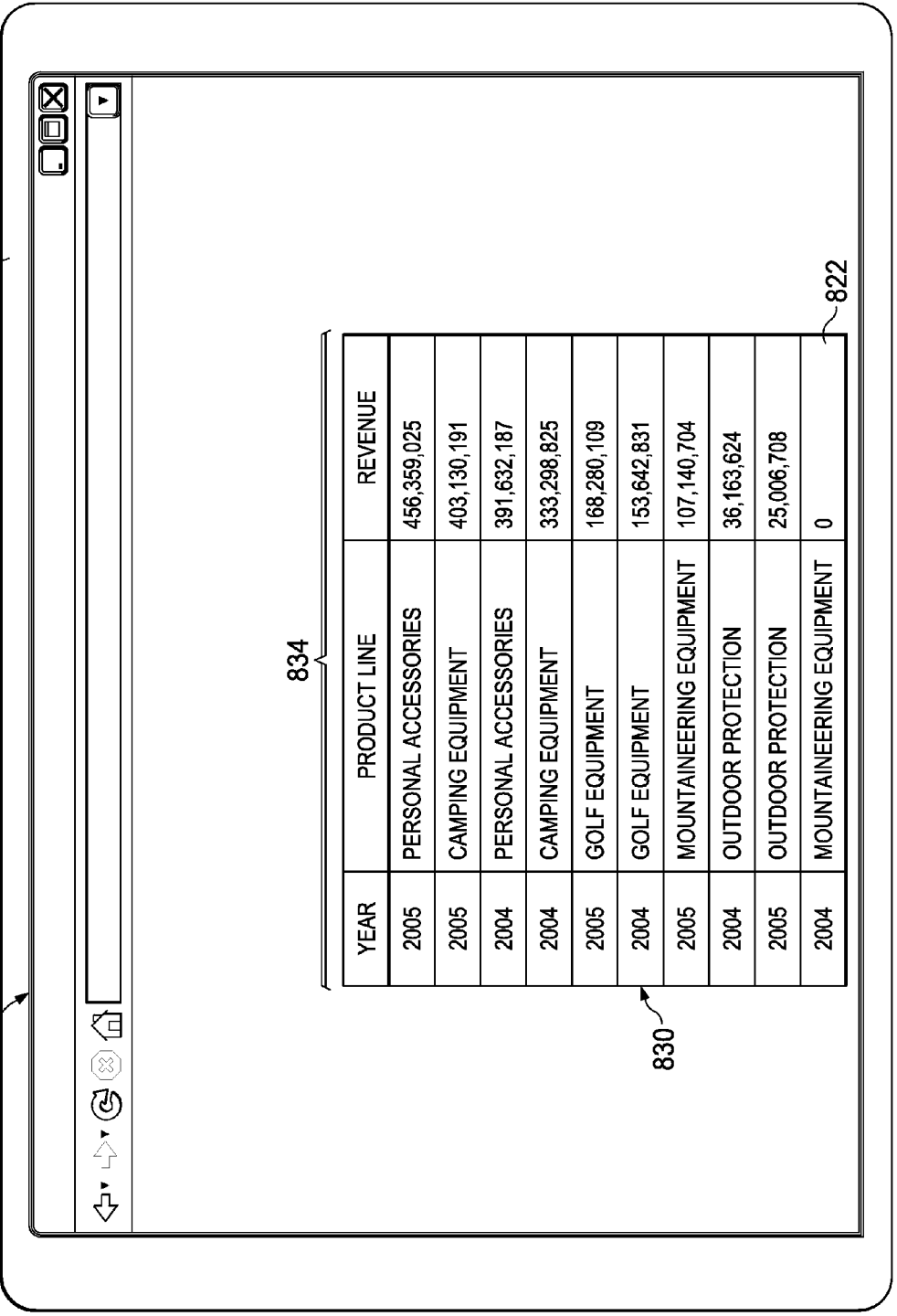

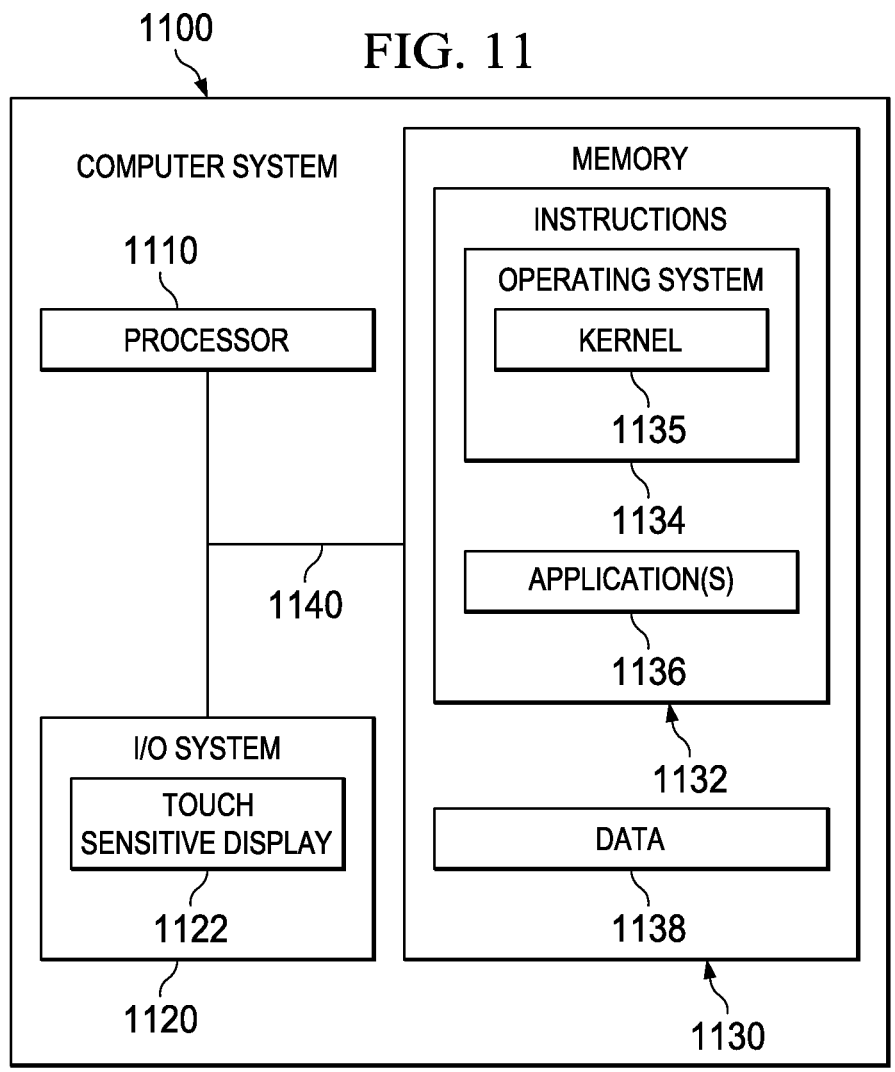

MODIFYING NUMERIC DATA PRESENTATION ON A DISPLAY

BACKGROUND

The present invention relates to presenting information on a display, and more specifically to modifying the presentation of information on a display.

Computer systems (e.g., workstations, personal computers, laptops, and personal digital assistants) have typically received input from users through user-manipulated devices (e.g., keyboards, mice, and styluses) and output information to users through displays. Recently, mobile computer systems (e.g., Apple's iPhone and iPad and Google Android devices) have become popular, at least in part, through the use of touch-sensitive displays. Using simple hand gestures on these systems, a user may perform various operations for a presented user interface, such as scrolling around the user interface, zooming in and out on the user interface, and rotating the user interface.

BRIEF SUMMARY

In one implementation, a process for modifying numeric data presented on a display may include generating a user interface including a section that has numeric data in a report format and determining when input via one or more user digits contacting a display presenting the user interface has been received. The process may also include determining whether the digit input is a command regarding the numeric data and generating, based on the command determination, a user interface that modifies the presentation of the numeric data and represents at least a majority of the numeric data. The process may, for example, be implemented by a computer system.

The details and features of various implementations will be conveyed by the following description, along with the drawings.

BRIEF DESCRIPTION OF THE SEVERAL VIEWS OF THE DRAWINGS

FIGS. 1A-B are line drawings that illustrate an example technique for modifying the presentation of numeric data on a display.

FIGS. 3A-B are line drawings that illustrate an example technique for modifying the presentation of numeric data on a display.

FIGS. 4A-B are line drawings that illustrate an example technique for modifying the presentation of numeric data on a display.

FIGS. 5A-B are line drawings that illustrate an example technique for modifying the presentation of numeric data on a display.

FIGS. 6A-B are line drawings that illustrate an example technique for modifying the presentation of numeric data on a display.

FIGS. 7A-B are line drawings that illustrate an example technique for modifying the presentation of numeric data on a display.

FIGS. 8A-B are line drawings that illustrate an example technique for modifying the presentation of numeric data on a display.

FIG. 11 is a block diagram illustrating an example computer system for modifying the presentation of numeric data on a display.

DETAILED DESCRIPTION

Figure 1B:
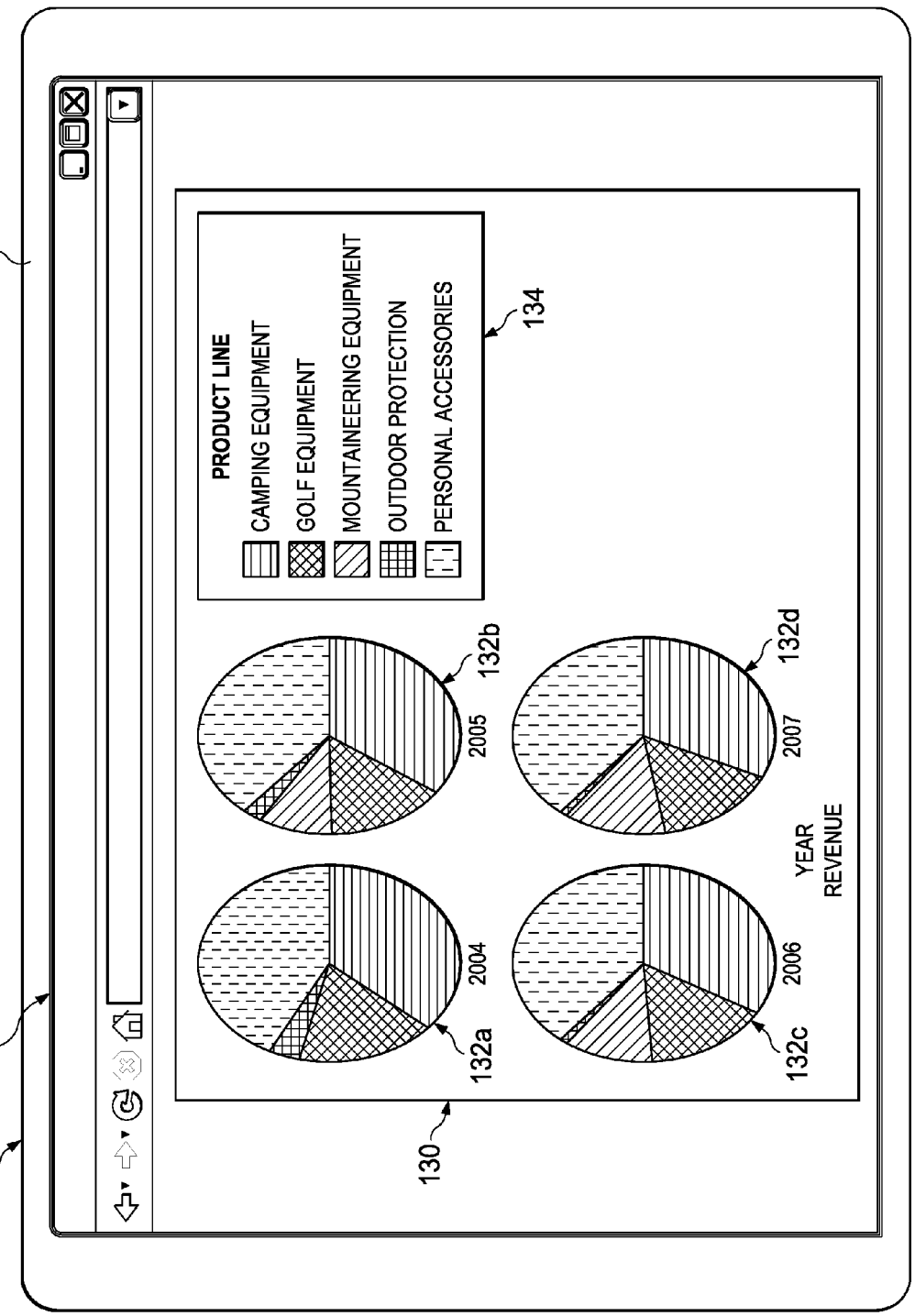

Numeric data presented on a display may be modified by a variety of techniques. In certain implementations, for example, numeric data may be modified by user input received via a touch-sensitive display. For instance, a user interface may be generated that includes a section having numeric data in a report format, and a determination may be made regarding whether input via one or more user digits contacting a display presenting the user interface has been received. If digit input has been received, it may be analyzed to determine whether the input is a command regarding the numeric data, and a user interface that modifies the presentation of the numeric data and represents at least a majority of the numeric data may be generated based on the determination.

As will be appreciated by one skilled in the art, aspects of the present disclosure may be implemented as a system, method, or computer program product. Accordingly, aspects of the present disclosure may take the form of an entirely hardware environment, an entirely software embodiment (including firmware, resident software, micro-code, etc.), or an implementation combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be a tangible medium that can contain or store a program for use by or in connection with an instruction execution system, apparatus, or device.

A computer readable signal medium may include a propagated data signal with computer readable program code embodied therein, for example in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any medium, including but not limited to wireless, wireline, optical fiber cable, RF, etc. or any suitable combination of the foregoing.

Computer program code for carrying out operations for aspects of the disclosure may be written in any combination of one or more programming languages such as Java, Smalltalk, C++, Objective C, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosure are described below with reference to flowchart illustrations and/or block diagrams of methods, apparatus (systems), and computer program products according to implementations. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other device to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions that execute on the computer or other programmable apparatus provide processes for implementing the functions/acts specified in the flowchart and/or block diagram block or blocks.

FIGS. 1A-B illustrate an example technique for modifying the presentation of numeric data on a display 100. Display 100 includes a surface 102 through which visual information may be presented and by which a user may provide input through contacting the surface—using one or more fingers, thumbs, or other appropriate digits. Visual information for display 100 may be generated by a cathode ray tube, a liquid crystal matrix, or any other appropriate visual information generator. Surface 102 is generally transparent so that the visual information can be viewed through it and includes sensors by which user contact may be detected (e.g., by pressure or heat techniques).

Display 100 may present a number of user interfaces depending on the operational state of a computer coupled thereto (e.g., directly or over a network). As illustrated, for example, display 100 presents a user interface 110a in FIG. 1A and a user interface 110b in FIG. 1B. In this example, both of user interface 110a and user interface 100b encompass a large portion of surface 102, but they could encompass less or more of the surface in other operational environments or implementations.

User interface 110a includes a data section 120 that presents numeric data 122 in a report format. A report format may, for example, be a table, a chart, or any other appropriate construct for conveying information in an ordered manner. As illustrated, numeric data 122 is presented in a cross-tab format, which is one type of tabular format. Additionally, data section 120 includes a header section 124 for the columns of numeric data 122 and a header section 126 for the rows of numeric data 122. As illustrated, numeric data 122 indicates revenue data for an organization (e.g., a store) by year (as indicated in header section 124) and merchandise category (as indicated in header section 126). However, numeric data 122 could indicate any other appropriate types of numeric data (e.g., supply chain data or engineering data). As illustrated, data section 120 encompasses a large portion of user interface 110a, but data section 120 may encompass less or more of the user interface.

User interface 110b also includes a data section 130 that presents numeric data in a report format. As illustrated, data section 130 of user interface 110b presents numeric data 122 in a chart format. In particular, data section 130 presents numeric data 122 as a series of pie charts 132, with each pie chart corresponding to each of the data columns in numeric data 122. Data section 130 also includes a legend 134 to aid in interpreting pie charts 132.

To transition from user interface 110a to user interface 110b, a user may touch surface 102 in a prescribed manner while display 100 is presenting user interface 110a. As illustrated, a user may touch a finger 140 to surface 102 over data section 120 and make a circular motion to indicate that one or more pie charts are desired.

Other appropriate digits and motions could also be used in other implementations. Moreover, a user may indicate a transition to a pie chart by performing the indication over other types of report formats (e.g., a list format).

Transitioning between user interfaces may be performed by generating the subsequent user interface and then presenting the user interface via the display. In certain implementations, for example, the subsequent user interface may be generated without reusing any elements of the previous user interface. As another example, generating the subsequent user interface may include reusing one or more elements (e.g., action buttons, dials, drop-down menus, etc.) in common between the previous user interface and the subsequent user interface. In particular implementations, for instance, only the data sections may change for the subsequently generated user interface.

Figure 2A:
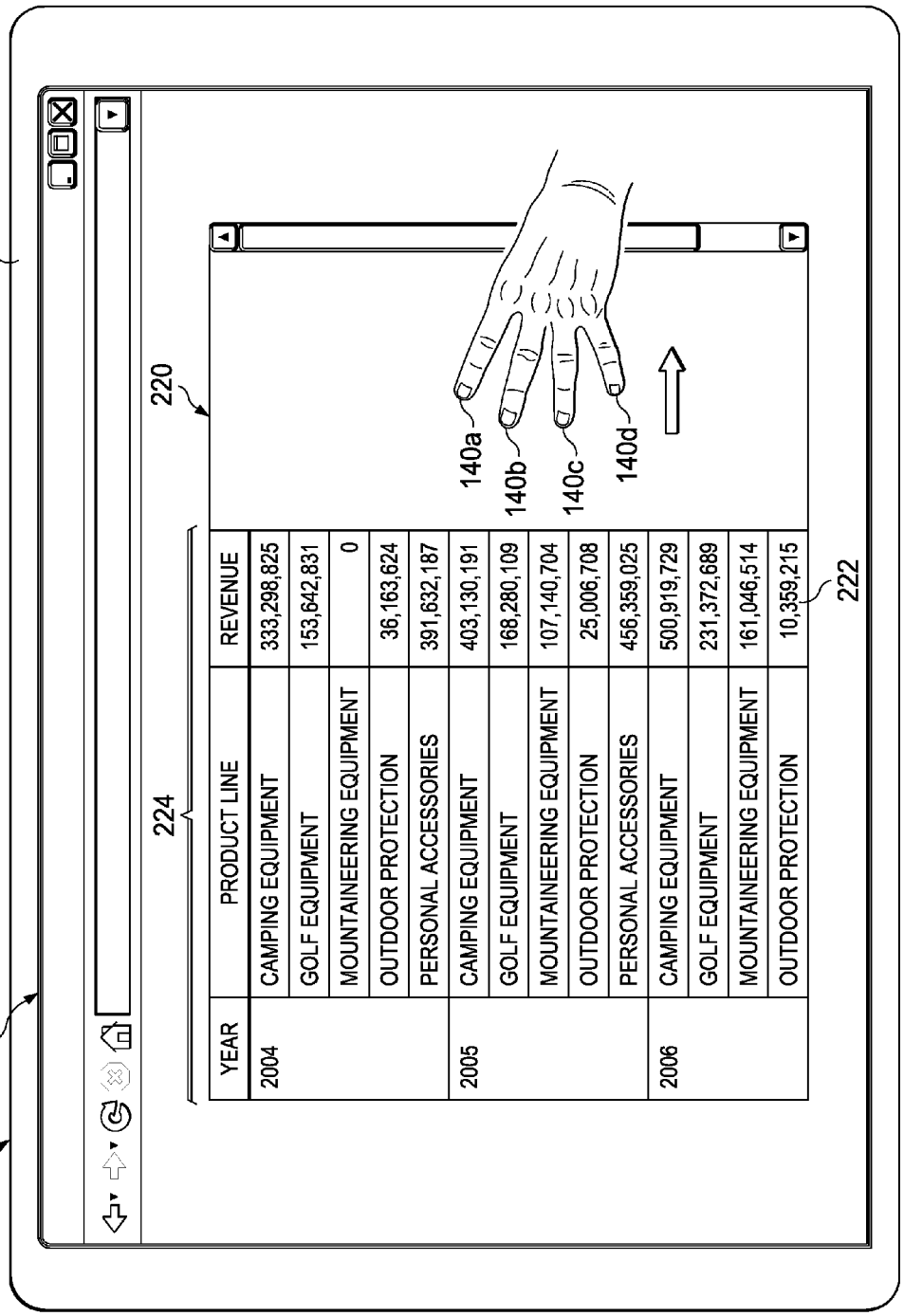
FIGS. 2A-B are line drawings that illustrate an example technique for modifying the presentation of numeric data on a display.
Figure 2B:
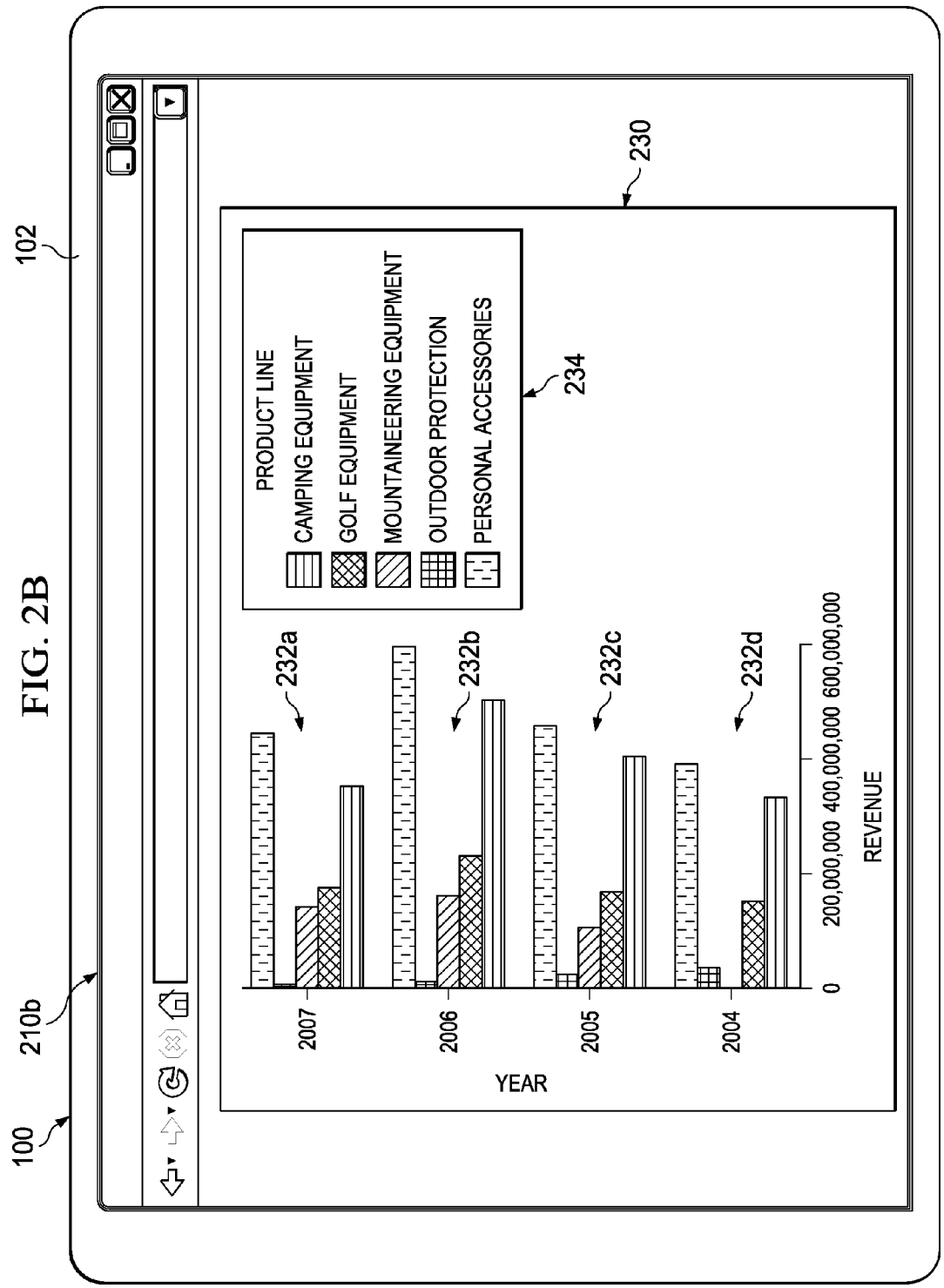

FIGS. 2A-B illustrate another example technique for modifying the presentation of numeric data on display 100. As illustrated, display 100 presents a user interface 210a in FIG. 2A and a user interface 210b in FIG. 2B.

User interface 210a includes a data section 220 that presents numeric data 222 in a report format. In this illustration, numeric data 222 is in a list format, which is another type of tabular format. Additionally, data section 220 includes a header section 224 for the columns of numeric data 222. As illustrated, numeric data 222 indicates revenue data for an organization by year and merchandise category (as indicated in header 224). However, numeric data 222 could indicate any other appropriate types of numeric data (e.g., supply chain data or engineering data).

User interface 210b also includes a data section 230 that presents numeric data in a report format. As illustrated, data section 230 of user interface 210b presents numeric data 222 in a chart format. In particular, data section 230 presents numeric data 222 as a series of horizontal bar charts, with each bar chart corresponding to a year in data section 220. Numeric data section 230 also includes a legend 234 to aid in interpreting bar charts 232.

To transition from user interface 210a to user interface 210b, a user may touch surface 102 in a prescribed manner while display 100 is presenting user interface 210a. As illustrated, a user may touch fingers 140 to surface 102 so that they are aligned with a direction of the surface (e.g., vertical) and drag them in another direction of the surface (e.g., horizontal).

Other appropriate digits and motions could also be used in other implementations. A user may also indicate a transition to a horizontal bar chart by providing input over other types of report formats (e.g., a cross-tab format).

In certain implementations, a user may use similar input to transition from a tabular format to a vertical bar chart. For example, a user may touch fingers 140 to surface 102 so that they are aligned with a different direction of the surface (e.g., horizontal) and drag them in another direction of the surface (e.g., vertical).

Figure 3B:
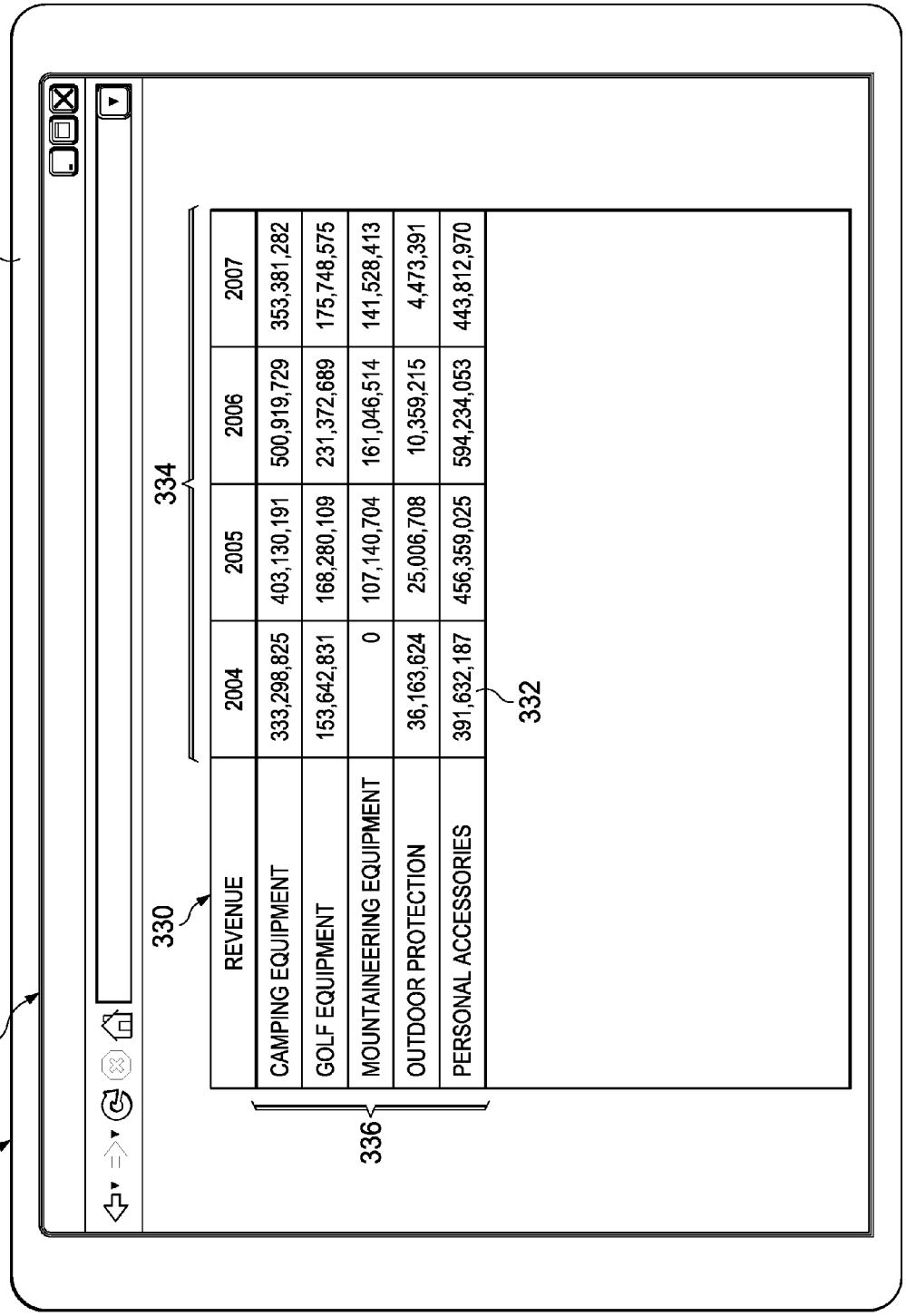

FIGS. 3A-B illustrate an additional example technique for modifying the presentation of numeric data on display 100. As illustrated, display 100 presents a user interface 310a in FIG. 3A and a user interface 310b in FIG. 3B.

User interface 310a includes a data section 320 that presents numeric data in a report format. As illustrated, data section 320 of user interface 310a presents numeric data in a chart format. In particular, data section 320 presents numeric data as a series of pie charts, with each pie chart corresponding to a year. Data section 320 also includes a legend 324 to aid in interpreting pie charts 322.

User interface 310b includes a data section 330 that presents numeric data 332 in a tabular format. Numeric data 332 is the base data for pie charts 322. Data section 330 also includes a header section 334 for the columns of numeric data 332 and a header section 336 for the rows of numeric data 332. As illustrated, numeric data 332 indicates revenue data for an organization by year (as indicated by header section 334) and merchandise category (as indicated by header section 336). However, numeric data 332 could indicate any other appropriate types of numeric data (e.g., supply chain data or engineering data).

To transition from user interface 310a to user interface 310b, a user may touch surface 102 in a prescribed manner while display 100 is presenting user interface 310a. As illustrated, a user may touch fingers 140 to surface 102 over numeric data section 320 so that they are aligned with the horizontal direction of the surface.

Other appropriate numbers of digits and orientations could also be used in other implementations. Moreover, the transition to user interface 310b could occur from other types of charts (e.g., bar charts) using the same digit input.

FIGS. 4A-B illustrate another example technique for modifying the presentation of numeric data on display 100. As illustrated, display 100 presents a user interface 410a in FIG. 4A and a user interface 410b in FIG. 4B.

User interface 410a includes a data section 420 that presents numeric data in a report format. As illustrated, data section 420 of user interface 410a presents numeric data in a chart format. In particular, data section 420 presents numeric data as a series of bar charts 422, with each bar chart corresponding to a year. Data section 420 also includes a legend 424 to aid in interpreting bar charts 422.

User interface 410b includes a data section 430 that presents numeric data 432 in a tabular format. Numeric data 432 is the base data for bar charts 422. Data section 430 also includes a header section 434 for the columns of numeric data 432. As illustrated, numeric data 432 indicates revenue data for an organization by year and merchandise category (as indicated in header section 434). However, numeric data 432 could indicate any other appropriate types of numeric data (e.g., supply chain data or engineering data).

To transition from user interface 410a to user interface 410b, a user may touch surface 102 in a prescribed manner while display 100 is presenting user interface 410a. As illustrated, a user may touch fingers 140 to surface 102 over data section 420 so that they are aligned with the vertical direction of the surface.

Other appropriate numbers of digits or orientations could also be used in other implementations. Moreover, the transition to user interface 410b could occur from other types of charts (e.g., bar charts) using the same digit input.

FIGS. 5A-B illustrate a further example technique for modifying the presentation of numeric data on display 100. As illustrated, display 100 presents a user interface 510a in FIG. 5A and a user interface 510b in FIG. 5B.

User interface 510a includes a data section 520 that presents numeric data 522 in a report format. In this illustration, numeric data 522 is in a cross-tab format. Additionally, data section 520 includes a header section 524 for the columns of numeric data 522 and a header section 526 for the rows of numeric data. As illustrated, numeric data 522 indicates revenue data for an organization by year (as indicated in header section 524) and merchandise category (as indicated in header section 526). However, numeric data 522 could indicate any other appropriate types of numeric data (e.g., supply chain data or engineering data).

User interface 510b also includes a data section 530 that presents numeric data 522 in a report format. In particular, data section 530 presents numeric data 522 in a cross-tab format, along with additional data for the "Camping Equipment" category. In this illustration, the additional data provides details regarding the data presented in user interface 510a.

To transition from user interface 510a to user interface 510b, a user may touch surface 102 in a prescribed manner while display 100 is presenting user interface 510a. As illustrated, a user may touch fingers 140a, 142a to surface 102 so that they contact the surface over a particular header cell of tabular data and move apart from each other.

Other appropriate digits and motions could also be used in other implementations. Moreover, the transition to user interface 410b could occur from other types of table formats (e.g., list formats) using the same digit input.

In particular implementations, a user may transition from a user interface like user interface 510b to one like user interface 510a to user interface 510b by performing an opposite input. For example, a user may touch surface 102 may touch digits to surface 102 so that they contact the surface over a particular header cell of tabular data and move toward from each other.

FIGS. 6A-B illustrate another example technique for modifying the presentation of numeric data on display 100. As illustrated, display 100 presents a user interface 610a in FIG. 6A and a user interface 610b in FIG. 6B.

User interface 610a includes a data section 620 that presents numeric data 622 in a report format. In this illustration, numeric data 622 is in a list format. Additionally, data section 620 includes a header section 624 for the columns of numeric data 622. As illustrated, numeric data 622 indicates revenue data for an organization by year and merchandise category (as indicated in header section 624). However, numeric data 622 could indicate any other appropriate types of numeric data (e.g., supply chain data or engineering data).

User interface 610b also includes a data section 630 that also presents numeric data in a report format. In particular, data section 630 presents some of numeric data 622 in a list format and includes a header section 634. Data section 630 does not, however, include a portion of numeric data 632 that was indicated by the user in user interface 610a (i.e., the 2004 Camping Equipment data).

To transition from user interface 610a to user interface 610b, a user may touch surface 102 in a prescribed manner while display 100 is presenting user interface 610a. As illustrated, a user may touch a finger 140 to surface 102 so that the finger contacts the surface over a particular cell of tabular data and move the finger towards the outside of data section 620.

Other appropriate digits and motions could also be used in other implementations. Moreover, a transition could be accomplished from other types of tabular data (e.g., cross tabs). In particular implementations, a user could add a data cell by touching a finger 140 to surface 102 so that the finger contacts the surface over a cell of data that is outside the data section and move the finger inside the data section.

Figure 7B:
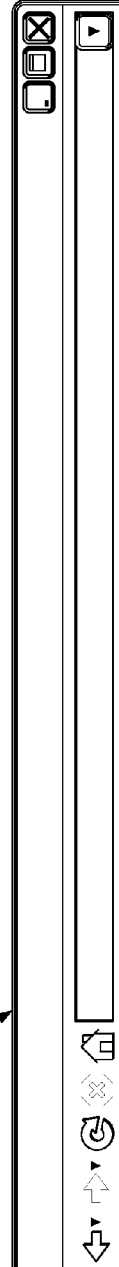

FIGS. 7A-B illustrate an additional example technique for modifying the presentation of numeric data on display 100. As illustrated, display 100 presents a user interface 710a in FIG. 7A and a user interface 710b in FIG. 7B.

User interface 710a includes a data section 720 that presents numeric data 722 in a report format. In this illustration, numeric data 722 is in a list format. Additionally, data section 720 includes a header section 724 for the columns of numeric data 722. As illustrated, numeric data 722 indicates revenue data for an organization by year and merchandise category (as indicated in header section 724). However, numeric data 722 could indicate any other appropriate types of numeric data (e.g., supply chain data or engineering data).

User interface 710b also includes a data section 730 that presents numeric data 722 in a report format. In particular, data section 730 also presents numeric data 722 in a list format. Data section 730, however, groups similar portions of numeric data 722 together, in this case the years.

To transition from user interface 710a to user interface 710b, a user may touch surface 102 in a prescribed manner while display 100 is presenting user interface 710a. As illustrated, a user may touch fingers 140a, 142a to surface 102 so that they contact the surface over a particular header cell of tabular data and move the fingers toward each other.

Other appropriate digits and motions could also be used in other implementations. Moreover, the transition could be accomplished for other types of tabular data (e.g., cross tabs). Moreover, a user could similarly ungroup data for a header by contacting the header with two digits and moving them toward each other.

FIGS. 8A-B illustrate a further example technique for modifying the presentation of numeric data on display 100. As illustrated, display 100 presents a user interface 810a in FIG. 8A and a user interface 810b in FIG. 8B.

User interface 810a includes a data section 820 that presents numeric data 822 in a report format. In this illustration, numeric data 822 is in a list format. Additionally, data section 820 includes a header section 824 for the columns of numeric data 822. As illustrated, numeric data 822 indicates revenue data for an organization by year and merchandise category (as indicated in header section 824). However, numeric data 822 could indicate any other appropriate types of numeric data (e.g., supply chain data or engineering data).

User interface 810b also includes a data section 830 that presents numeric data in a report format. In particular, data section 830 also presents numeric data 822 in a list format. Data section 830, however, presents numeric data 822 in a different order—sorted by revenue.

To transition from user interface 810a to user interface 810b, a user may touch surface 102 in a prescribed manner while display 100 is presenting user interface 810a. As illustrated, a user may touch finger 140a to surface 102 so it contacts the surface over a particular header cell of tabular data and move the finger upwards. This input causes the data associated with that header cell to be reordered (i.e., in ascending order in this example), along with the associated data.

Other appropriate digits and motions could be used in other implementations. Moreover, a user could similarly sort the data in a different order (e.g., descending) by contacting the header cell with a digit and moving it in the other direction.

Figure 9A:
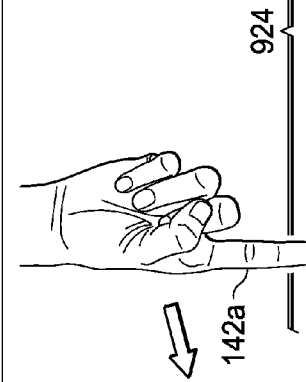
FIGS. 9A-B are line drawings that illustrate an example technique for modifying the presentation of numeric data on a display.
Figure 9B:
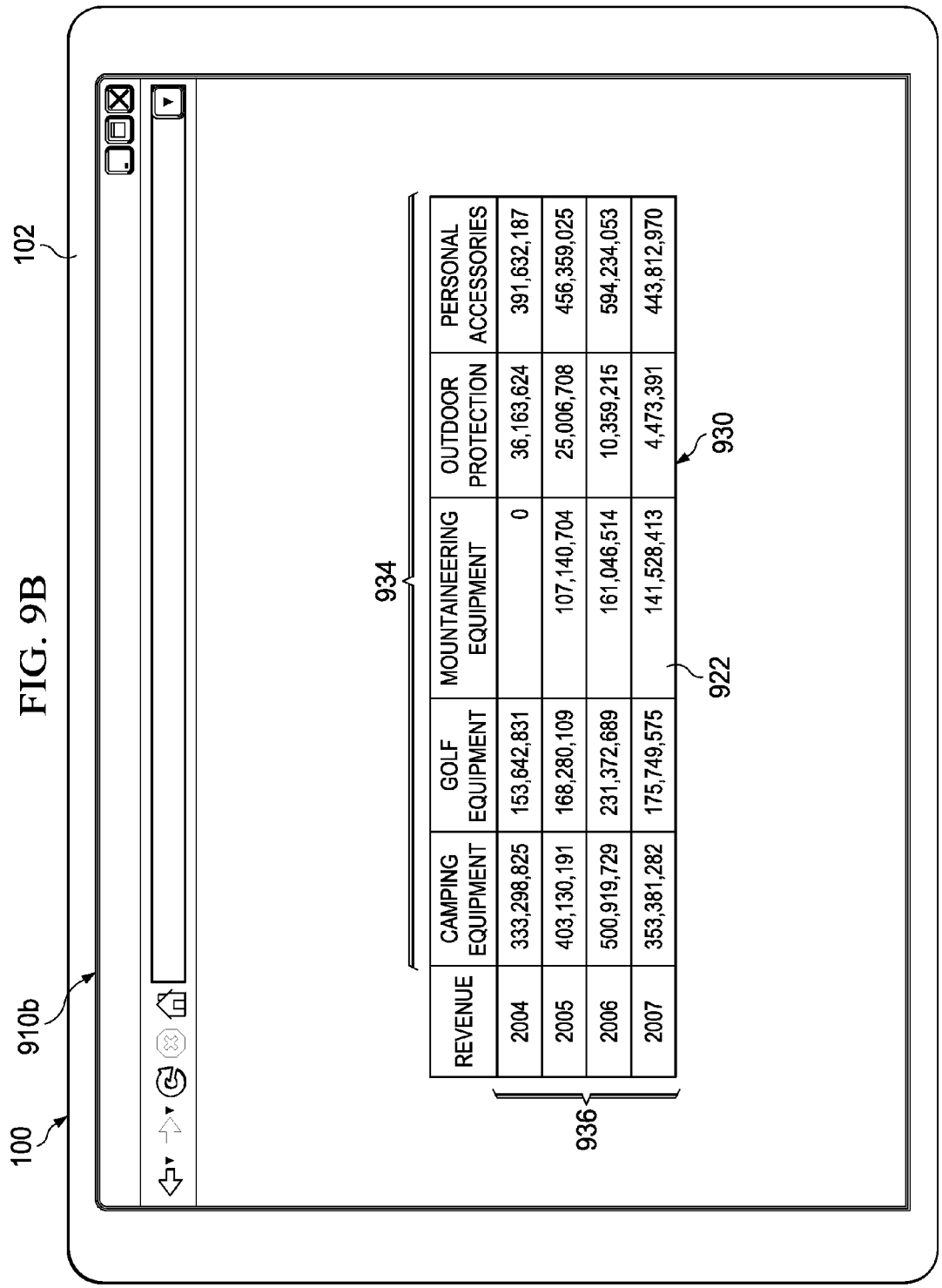

FIGS. 9A-B illustrate another example technique for modifying the presentation of numeric data on display 100. As illustrated, display 100 presents a user interface 910a in FIG. 9A and a user interface 910b in FIG. 9B.

User interface 910a includes a data section 920 that presents numeric data 922 in a report format. In this illustration, numeric data 922 is in a list format. Additionally, data section 920 includes a header section 924 for the columns of numeric data 922 and a header section 926 for the rows of numeric data 922. As illustrated, numeric data 922 indicates revenue data for an organization by year (as indicated in header section 924) and merchandise category (as indicated in header section 926). However, numeric data 922 could indicate any other appropriate types of numeric data (e.g., supply chain data or engineering data).

User interface 910b also includes a data section 930 that presents numeric data in a report format. In particular, data section 930, which includes a header section 934 for columns and a header section 936 for rows, also presents numeric data 922 in a list format. Data section 930, however, presents numeric data 922 in a transposed manner from that of data section 920. That is, the column data in data section 920 is presented as row data in data section 930, and the row data in data section 920 is presented as column data in data section 930.

To transition from user interface 910a to user interface 910b, a user may touch surface 102 in a prescribed manner while display 100 is presenting user interface 910a. As illustrated, a user may touch finger a 140a to surface 102 so that the finger contacts the surface over header section 924 and a finger 142 to the surface so the finger contacts the surface over header section 926 and move the fingers towards each other.

Other appropriate digits and motions could be used in other implementations. Moreover, a user could similarly transpose the numeric data again by repeating the sequence.

The techniques for modifying the presentation of numeric data illustrated by FIGS. 1A-9B have a variety of features. For example, a user does not have to manipulate an input device (e.g., a keyboard, a mouse, or a stylus) to indicate their intentions regarding numeric data in a user interface, which can provide a quicker manner for the user to input instructions. Additionally, the instructions may be provided in an intuitive manner. Thus, the user may be able to readily learn the instruction techniques.

Figure 10A:
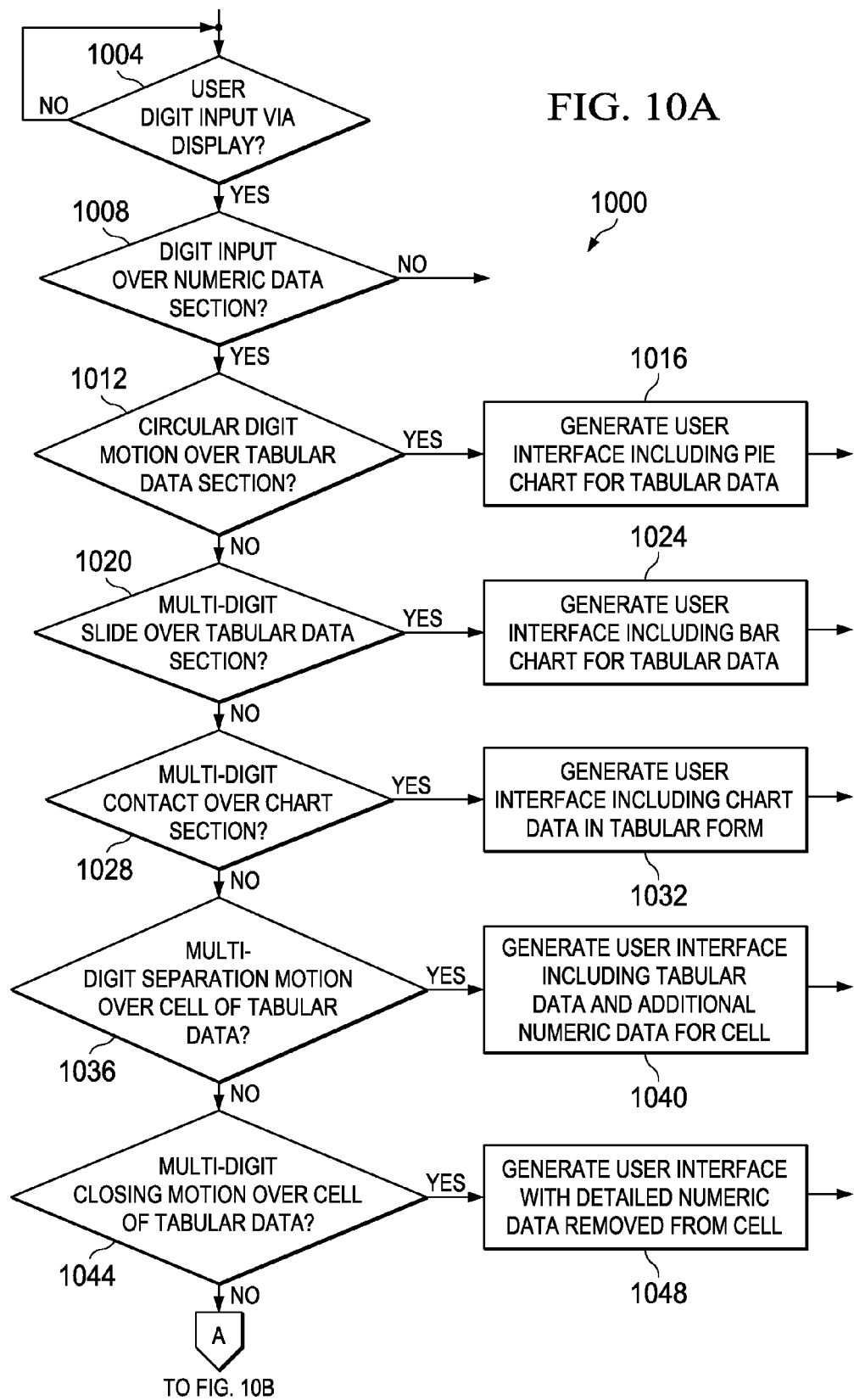
FIGS. 10A-B are a flowchart illustrating another example process for modifying the presentation of numeric data on a display.
Figure 10B:
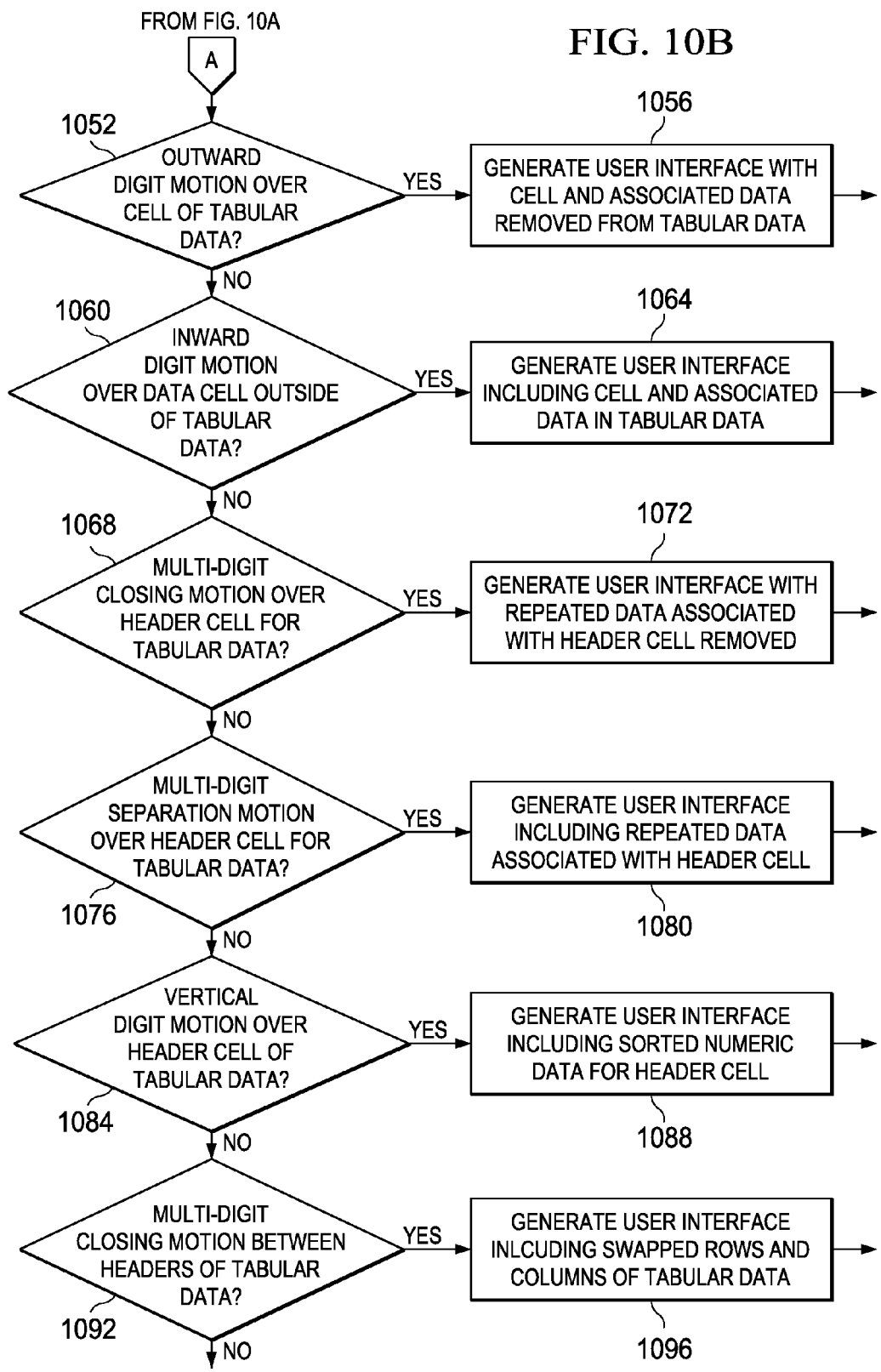

FIG. 10 illustrates an example process 1000 for modifying the presentation of numeric data on a display. Process 1000 may, for example, be executed by a computer system.

Process 1000 calls for determining whether a user has provided digit input via a display (operation 1004). A user may, for example, provide digit input by touching one or more digits (e.g., fingers and/or thumbs) to a touch-sensitive display. If the user has not provided digit input via a display, process 1000 continuing to wait for the user to provide such input.

Once a user has provided digit input via a display, process 1000 calls for determining whether the user digit input is over a display area that is presenting a numeric data section (operation 1008). The numeric data section may, for example, be part of a user interface that was previously generated. If the user digit input is not over a display area that is presenting a numeric data section, process 1000 is at an end. A user may, for example, provide digit input via a display and have it not be directed to a numeric data section because the input was entered incorrectly (e.g., inadvertently or haphazardly) or because the digit input is directed to a different display area.

If, however, the user digit input is over a numeric data section, process 1000 calls for determining whether the user input is a circular digit motion over a tabular data section (operation 1012). If the user input is a circular digit motion over a tabular data section, process 1000 calls for generating a user interface including one or more pie charts based on the tabular data (operation 1016). Process 1000 is then at an end.

If the user input is not a circular digit motion over a tabular data section, process 1000 calls for determining whether the user input is a multi-digit (e.g., four finger) slide motion over a tabular data section (operation 1020). If the user input is a multi-digit slide motion over a tabular data section, process 1000 calls for generating a user interface including a bar chart based on the tabular data (operation 1024). In particular implementations, if the multi-digit motion is in the horizontal direction, the bar chart may be a horizontal bar chart, and if the multi-digit motion is in the vertical direction, the bar chart may be a vertical bar chart. Process 1000 is then at an end.

If, however, the user input is not a multi-digit slide motion over a tabular data section, process 1000 calls for determining whether the user input is a multi-digit (e.g., four finger) contact over a chart section (operation 1028). If the user input is a multi-digit contact over a chart section, process 1000 calls for generating a user interface including chart data in tabular form (operation 1032). In particular implementations, if the multi-digit contact is aligned one way (e.g., horizontally), the data may be presented as a list table, and if the multi-digit contact is aligned another way (e.g., vertically), the data may be presented as a cross-tab table. Process 1000 is then at an end.

If the user input is not a multi-digit contact over a chart section, process 1000 calls for determining whether the user input is a multi-digit (e.g., two finger) separation motion over a cell of tabular data (operation 1036). If the user input is a multi-digit separation motion over a cell of tabular data, process 1000 calls for generating a user interface including the tabular data and additional numeric data for the cell (operation 1040). The additional data may, for example, provide underlying details for the selected cell. Process 1000 is then at an end.

If, however, the user input is not a multi-digit separation motion over a cell of tabular data, process 1000 calls for determining whether the user input is a multi-digit (e.g., thumb and finger) closing motion over a cell of tabular data (operation 1044). If the user input is a multi-digit closing motion over a cell of tabular data, process 1000 calls for generating a user interface with detailed numeric data removed from the cell (operation 1048). Process 1000 is then at an end.

If the user input is not a multi-digit closing motion over a cell of tabular data, process 1000 calls for determining whether the user input is a digit motion towards the outside of presented tabular data over a cell of tabular data (operation 1052). If the user input is an outward digit motion over a cell of tabular data, process 1000 calls generating a user interface with the cell and its associated data removed from the tabular data (operation 1056). Process 1000 is then at an end.

If, however, the user input is not an outward digit motion over a cell of tabular data, process 1000 calls for determining whether the user input is a digit motion towards the inside of presented tabular data over a data cell outside of the presented tabular data (operation 1060). If the user input is an inward digit motion over a data cell outside of tabular data, process 1000 calls for generating a user interface including the data cell and its associated data in the presented tabular data (operation 1064). Process 1000 is then at an end.

If the user input is not an inward digit motion over a data cell outside of tabular data, process 100 calls for determining whether the user input is a multi-digit (e.g., finger and thumb) closing motion over a header cell for tabular data (operation 1068). If the user input is a multi-digit closing motion over a header cell for tabular data, process 1000 calls for generating a user interface including the tabular data, but with repeated data associated with the header cell removed (operation 1072). Process 1000 is then at an end.

If, however, the user input is not a multi-digit closing motion over a header cell for tabular data, process 1000 calls for determining whether the user input is a multi-digit separation motion over a header cell for tabular data (operation 1076). If the user input is a multi-digit separation motion over a header cell, process 1000 calls for generating a user interface including the tabular data and repeated data associated with the header cell (operation 1080). Process 1000 is then at an end.

If the user input is not a multi-digit separation motion over a header cell, process 1000 calls for determining whether the user input is a vertical digit motion over a header cell of tabular data (operation 1084). If the user input is a vertical digit motion over a header cell, process 1000 calls for generating a user interface including the numeric data, but with the numeric data associated with the header cell sorted (operation 1088). In particular implementations, an upward motion may cause the data to be sorted in an ascending order, and a downward motion may cause the data to be sorted in a descending order. The data in associated rows may also be reorganized. Process 1000 is then at an end.

If, however, the user input is not a vertical digit motion over a header cell, process 1000 calls for determining whether the user input is a multi-digit (e.g., finger and thumb) closing motion between headers for tabular data (operation 1092). If the user input is a multi-digit closing motion between headers, process 1000 calls for generating a user interface with the rows and columns of the tabular data swapped (operation 1096). Process 1000 is then at an end.

If the user input is not a multi-digit closing motion between headers, process 1000 is at an end. Note that a user may enter digit input over a numeric data section but process 1000 may not accommodate the input. For example, the use may input unrecognizable digit input (e.g., inadvertently or haphazardly) or digit input that is directed at a different operation.

Although FIG. 10 illustrates one process for modifying the presentation of numeric data on a display, other processes may include fewer, additional, and/or a different arrangement of operations. For example, any of the digit determination operations could be removed, and other digit determination operations could be added. Moreover, the digit determinations may be performed in any order. Additionally, process 1000 could be repeated multiple times for the same numeric data, with the generated user interfaces being presented by the same display.

The flowchart and block diagrams in the figures illustrate the architecture, functionality, and operation of systems, methods, and computer program products of various implementations of the disclosure. In this regard, each block in the flowchart or block diagrams may represent a module, segment, or portion of code, which can include one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or the flowchart illustration, and combination of blocks in the block diagrams and/or flowchart illustration, can be implemented by special purpose hardware-based systems the perform the specified function or acts, or combinations of special purpose hardware and computer instructions.

FIG. 11 illustrates an example computer system 1100 that may modify numeric data presented on a display. System 1100 includes a processor 1110, an input/output system 1120, and memory 1130, which are coupled together by a network 1140.

Processor 1110 typically includes a logical processing unit (e.g., an arithmetic logic unit) that processes data under the direction of program instructions (e.g., from software). For example, processor 1110 may be a microprocessor, a microcontroller, or an application specific integrated circuit. The processor may operate by reduced instruction set computer (RISC) or complex instruction set computer (CISC) principles. In general, the processor may be any device that manipulates data in a logical manner.

Input/output system 1120 includes a touch sensitive display 1122 and may include one or more communication interfaces and/or one or more other user interfaces. A communication interface may, for instance, be a network interface card (whether wireless or wireless) or a modem. A user interface could, for instance, be a user input device (e.g., a keyboard, a keypad, a touchpad, a stylus, or a microphone) or a user output device (e.g., a monitor, a display, or a speaker). In general, system 1120 may be any combination of devices by which a computer system can receive and output data.

Memory 1130 may, for example, include random access memory (RAM), read-only memory (ROM), and/or disc memory. Various items may be stored in different portions of the memory at various times. Memory 1130, in general, may be any combination of devices for storing data.

Memory 1130 includes instructions 1132 and data 1138. Instructions 1132 include an operating system 1134 (e.g., Windows, Linux, or Unix) and applications 1136 (e.g., word processing, spreadsheet, drawing, scientific, etc.). Data 1138 includes the data required for and/or produced by applications 1134.

Operating system 1134 includes a kernel 1135. Kernel 1135 provides a bridge between applications and the actual data processing performed at the hardware level, and its responsibilities include managing the computer system's resources (e.g., the communication between hardware and software components).

Network 1140 is responsible for communicating data between processor 1110, input/output system 1120, and memory 1130. Network 1140 may, for example, include a number of different types of busses (e.g., serial and parallel).

In one mode or operation, when a user touches display 1122, the operating system 1134 detects the contact and creates an event. The event is then interpreted by an application (e.g., by a process similar to process 1000), and the application reacts to the contact (e.g., by generating a new user interface based on the contact or ignoring the contact). The new user interface may then be presented by display 1122.

The terminology used herein is for the purpose of describing particular implementations only and is not intended to be limiting. As used herein, the singular form "a", "an", and "the" are intended to include the plural forms as well, unless the context clearly indicates otherwise. It will be further understood that the terms "comprises" and/or "comprising," when used in the this specification, specify the presence of stated features, integers, steps, operations, elements, and/or components, but do not preclude the presence or addition of one or more other features, integers, steps, operations, elements, components, and/or groups therefore.

The corresponding structure, materials, acts, and equivalents of all means or steps plus function elements in the claims below are intended to include any structure, material, or act for performing the function in combination with other claimed elements as specifically claimed. The description of the present implementations has been presented for purposes of illustration and description, but is not intended to be exhaustive or limited to the implementations in the form disclosed. Many modifications and variations will be apparent to those of ordinary skill in the art without departing from the scope and spirit of the disclosure. The implementations were chosen and described in order to explain the principles of the disclosure and the practical application and to enable others or ordinary skill in the art to understand the disclosure for various implementations with various modifications as are suited to the particular use contemplated.

A number of implementations have been described for modifying the presentation of numeric data on a display, and several others have been mentioned or suggested. Moreover, those skilled in the art will readily recognize that a variety of additions, deletions, modifications, and substitutions may be made to these implementations while still achieving modification of the presentation of numeric data on a display. Thus, the scope of the protected subject matter should be judged based on the following claims, which may capture one or more aspects of one or more implementations.

The invention claimed is:

1. A method implemented by a computer, the method comprising:
    generating a user interface comprising a section including numeric data in a report format;
    determining when input via one or more user digits contacting a display presenting the user interface has been received;
    determining whether the digit input is a command regarding the numeric data; and
    generating a user interface that modifies the presentation of the numeric data based on the command determination, the modified presentation representing at least the majority of the numeric data; and
    wherein the command determination comprises determining whether a multi-digit separation motion over a cell of tabular data in the presented numeric data section has been input;

wherein the modification comprises generating a user interface comprising the tabular data and data related to the numeric data in the cell, the data related to the numeric data in the cell comprising underlying details of the numeric data in the cell;

wherein the report format comprises column headers and row headers, and further comprising:

receiving a multi-digit closing motion that starts over a column header and a row header; and generating a user interface with the places of the column headers, the row headers, and the associated data swapped.

2. The method of claim 1, further comprising:

receiving a circular digit motion over the presented numeric data section;

generating a user interface including a pie chart based on the numeric data.

3. The method of claim 1, further comprising:

receiving a multi-digit slide over the presented numeric data section; and generating a user interface including a bar chart based on the numeric data.

4. The method of claim 1, further comprising:

receiving a digit motion that begins over a cell of the presented numeric data section and moves towards the outside of the numeric data section; and generating a user interface with the cell of the numeric data removed from the numeric data section.

5. The method of claim 1, further comprising:

receiving a digit motion that begins over a numeric data cell that is outside the presented numeric data section and moves towards the presented numeric data section; and generating a user interface including the numeric data cell in the numeric data section.

6. The method of claim 1, wherein the report format comprises column headers, and further comprising:

receiving a multi-digit separation motion over a cell of a presented column header; and generating a user interface with repeated values removed from the associated column.

7. The method of claim 1, wherein the report format comprises column headers, and further comprising:

receiving a multi-digit closing motion over a cell of a presented column header; and generating a user interface including repeated values in the associated column.

8. The method of claim 1, wherein the report format comprises column headers, and further comprising:

receiving a vertical digit motion over a cell of a presented column header; and generating a user interface that has the data in the associated column sorted.

9. The method of claim 1, further comprising:

receiving a multi-digit closing motion over a header cell of a header section of the tabular data; and generating a user interface with similar portions of the numeric data in cells defined by the header cell grouped together as a single cell.

10. A computer program product for modifying numeric data presented on a display, the computer program product comprising:

a computer readable storage device;

first program instructions to generate a user interface comprising a section including numeric data in a report format;

second program instructions to determine when input via one or more user digits contacting a display presenting the user interface has been received;

third program instructions to determine whether the digit input is a command regarding the numeric data; and fourth program instructions to generate a user interface that modifies the presentation of the numeric data based on the command determination, the modified presentation representing at least the majority of the numeric data;

wherein the command determination comprises determining whether a multi-digit separation motion over a cell of tabular data in the presented numeric data has been input;

wherein the modification comprises generating a user interface comprising the tabular data and data related to the numeric data in the cell, the data related to the numeric data in the cell comprising underlying details of the numeric data in the cell; and wherein the report format comprises column headers and row headers, and further comprising:

fifth program instructions to generate, in response to receiving a multi-digit closing motion that starts over a column header and a row header, a user interface with the places of the column headers, the row headers, and the associated data swapped; and wherein said program instructions are stored on said computer readable storage device.

11. The computer program product of claim 10, further comprising:

receiving a circular digit motion over the presented numeric data section; and generating a user interface including a pie chart based on the numeric data.

12. The computer program product of claim 10, further comprising:

receiving a multi-digit slide over the presented numeric data section; and generating a user interface including a bar chart based on the numeric data.

13. The computer program product of claim 10, further comprising:

receiving a multi-digit separation motion over a cell of tabular data in the presented numeric data section; and generating a user interface comprising the tabular data and data related to the numeric data in the cell.

14. The computer program product of claim 10, further comprising:

receiving a digit motion that begins over a cell of the presented numeric data section and moves towards the outside of the numeric data section; and generating a user interface with the cell of the numeric data removed from the numeric data section.

15. The computer program product of claim 10, wherein the report format comprises column headers, and further comprising:

receiving a vertical digit motion over a cell of a presented column header; and generating a user interface that has the data in the associated column sorted.

16. The computer program product of claim 10, further comprising:

receiving a multi-digit closing motion over a header cell of a header section of the tabular data; and generating a user interface with similar portions of the numeric data in cells defined by the header cell grouped together as a single cell.

17. A system, comprising:

a processor;

an input/output (I/O) system comprising a touch sensitive display; and an operating system operable to:

display numeric data;

determine when input via one or more user digits contacting the display has been received;

determine whether the digit input is a command regarding the numeric data; and generate a user interface that modifies the presentation of the numeric data based on the command determination, the modified presentation representing at least the majority of the numeric data; and wherein the operating system is operable to determine whether a multi-digit separation motion over a cell of tabular data in the displayed numeric data has been input; and wherein the modified presentation comprises generating a user interface comprising the tabular data and data related to the numeric data in the cell, the data related to the numeric data in the cell comprising underlying details of the numeric data in the cell;

wherein the report format comprises column headers and row headers, and wherein the operating system is further operable to:

receive a multi-digit closing motion that starts over a column header and a row header; and generate a user interface with the places of the column headers, the row headers, and the associated data swapped.

18. The system of claim 17, wherein the operating system is operable to:

determine when input via the display comprises a multi-digit closing motion over a header cell of a header section of the tabular data; and in response to determining the multi-digit closing motion over the header cell of the header section, generate a modified presentation where similar portions of the numeric data in cells defined by the header cell are grouped together.

\* \* \* \* \*